United States Patent [19]
Völpel et al.

[11] Patent Number: 5,040,645
[45] Date of Patent: Aug. 20, 1991

[54] CYLINDER PISTON DEVICE

[75] Inventors: Stefan Völpel, Koblenz; Wolfgang Zankl, Vallendar, both of Fed. Rep. of Germany

[73] Assignee: Stabilus GmbH, Koblenz-Neuendorf, Fed. Rep. of Germany

[21] Appl. No.: 460,297

[22] Filed: Jan. 3, 1990

[30] Foreign Application Priority Data

Jan. 14, 1989 [DE] Fed. Rep. of Germany ....... 3900927

[51] Int. Cl.⁵ .............................. F16F 9/02; F05F 3/12
[52] U.S. Cl. ...................................... 188/287; 267/120
[58] Field of Search ............... 188/286, 287, 315, 318; 267/64.12, 113, 118, 120, 124, 126, 127; 296/56

[56] References Cited

U.S. PATENT DOCUMENTS

| | | | |
|---|---|---|---|
| 1,548,773 | 8/1925 | Ziebarth | 188/287 |
| 1,658,962 | 2/1928 | Aikens | 188/287 |
| 3,301,410 | 1/1967 | Seay | 267/120 X |
| 4,066,279 | 1/1978 | Kaptanis | 280/711 |
| 4,156,523 | 5/1979 | Bauer | 267/120 |

*Primary Examiner*—Matthew C. Graham
*Attorney, Agent, or Firm*—Brumbaugh, Graves, Donohue & Raymond

[57] ABSTRACT

According to an illustrative example of the invention, a gas spring comprises a cylinder, a piston rod extending through one end of the cylinder and a piston connected with the piston rod within the cylinder. A pressurized gas is contained within the cylinder. A container surrounds the cylinder. An annular space is defined between the cylinder and the container. The cylinder is subdivided by the piston rod into two working chambers. The annular space is subdivided by a separating ring into two axially adjacent sections. Radial bores through the cylinder extend between the working chambers and the two sections of the annular space. Each of the two sections of the annular space defines together with allocated radial bores flow paths adapted to interconnect the working chambers across the piston, such that in respective axially adjacent movement ranges of the piston, the working chambers are interconnected with each other, and in an intermediate standstill range between said axially adjacent movement ranges, the flow connection between the two working chambers is interrupted.

23 Claims, 4 Drawing Sheets

CYLINDER PISTON DEVICE

BACKGROUND OF THE INVENTION

This invention relates to a cylinder piston device of the type used e.g. in vehicle constructions as a counterweight for a boot flap or an engine bonnet. It is desirable that in such constructions the boot flap or engine bonnet can be positioned in at least one additional position between the fully closed position and the fully open position. This requirement exists both in those cases in which the cylinder piston device provides a lifting force sufficient to overcome the weight of the respective boot flap or engine bonnet and also in these cases in which additional force must be exerted on the flap or bonnet by hand in order to open the flap or bonnet, respectively.

STATEMENT OF THE PRIOR ART

A cylinder piston device of the type as mentioned above is known from German Patent 25 13 302. The cylinder piston device of the German Patent 25 13 302 is a so-called gas spring. In this known construction, two working chambers on both sides of a piston are interconnectable across the piston member through at least two flow passage systems in response to the axial position of the piston member such that, in respective axially adjacent movement ranges of the piston member, the working chambers are interconnected with each other by a respective one of said two flow passage systems, and in an intermediate standstill range between said axially adjacent movement ranges the working chambers are not interconnected. The movement of the piston member and the piston rod member is stopped, when the piston member approaches the said intermediate standstill range. In the known construction, the flow passage systems are based on the existence of axially extending grooves which are located in the internal cylindrical surface of the cylinder member. E.g., there are provided two axially subsequent axially extending grooves which are separated from each other by a grooveless axial section of the internal wall of the cylinder member. As long as the piston member moves along one of the grooves, there exists an open flow passage system between the working chambers within the cylinder. If the piston member enters into the grooveless area, the working chambers are separated from each other so that the piston member and the piston are blocked and cannot be moved without additional force to be exerted onto the piston rod member. It has been found that this design has a considerable disadvantage in that a piston ring provided on the piston member and engageable with the internal cylinder face of the cylinder member is worn by the longitudinal grooves. As a result of such wear, a leak of fluid occurs between the working chambers even when the piston member is located in the grooveless section so that the blocking of the piston rod member in this location is not further guaranteed. Even with rounded longitudinal grooves which have been produced extremely carefully, there is further a risk that a resilient piston ring, such as an O-ring, will be pressed into the respective groove such that the flow cross-section of the groove is variable in a non-controllable manner so that the damping action onto the piston rod member is out of control.

OBJECT OF THE INVENTION

The object of the present invention is to provide a cylinder piston device in particular for vehicle flaps and bonnets which guarantees a perfect stop at a predetermined opening angle even after a long period of use. Further, it is required that the damping action of the cylinder piston device should maintain a predetermined value without significant alterations.

SUMMARY OF THE INVENTION

A cylinder piston device comprises a cylinder member. This cylinder member defines a cavity therein, and this cavity has an axis and two ends A piston rod member is sealingly guided through at least one of said two ends. A piston member sealingly engageable with an internal cylindrical face of the cylinder member is connected with the piston rod member within the cavity, such as to divide the cavity into two working chambers. The working chambers contain a fluid, such as a pressurized gas or a pressurized liquid, the pressure of which results from the presence of a volume of pressurized gas or from the presence of a separating wall acting onto the liquid with one face thereof and being subject to the action of a mechanical spring on the other side thereof The working chambers are interconnectable across the piston member through at least one flow passage system in response to the axial position of the piston member such that in a movement range of said piston member said working chambers are interconnected with each other by said flow passage system and in a standstill range of said piston member adjacent said movement range, said working chambers are not interconnected by said flow passage system. Said flow passage system comprises at least two axially spaced orifices substantially radially across the wall of said cylinder member, said axially spaced orifices of said flow passage system being interconnected by a substantially axially extending flow path radially outside said cylinder member.

Preferably at least one of said axially spaced orifices of the flow passage system is shaped as a radial bore through the cylinder˜ member, and more preferably, both of said at least two axially spaced orifices of said flow passage system are shaped as a radial bore through the cylinder member. In case of said orifices being radial bores, it is desirable that at least those bores which come into engagement with a sealing face of the piston member should be rounded adjacent the internal cylindrical face of the cylinder member such that wear onto the sealing face of the piston member is reduced. Such rounding can be obtained by pressing a ball-shaped or conical tool towards the respective edge of the bore.

During the movement of the piston member axially between subsequent orifices of the flow passage system, the flow resistance of this flow passage system is not influenced by the sealing face of the piston member.

According to a preferred embodiment of the invention, the working chambers are interconnectable across the piston member through at least two flow passage systems in response to an axial position of the piston member such that, in respective axially adjacent movement ranges of said piston member, said working chambers are interconnected with each other by a respective one of said flow passage systems, and in an intermediate standstill range between said axially adjacent movement ranges, none of said flow passage systems interconnects said working chambers In this embodiment, it is possible to provide at least one stabile intermediate position of a flap or bonnet between the fully closed position and the fully opened position.

The orifices allocated to a respective flow passage system may be interconnected outside the cylinder member by a respective conduit, such as a tubular conduit.

It is also possible to shape the respective flow paths as grooves provided on the external face of the cylinder member and to cover such external grooves by a covering tube surrounding the cylinder member. Preferably, the flow paths between the at least two orifices of a respective flow passage system are provided within an annular space radially between the cylinder member and a container surrounding the cylinder member.

In case of such an annular space, respective flow paths of axially adjacent flow passage systems may be defined by respective axially adjacent sections of the annular space, and these sections may be separated from each other by a respective annular separating member extending radially between the cylinder member and the container member.

It is easy in manufacturing to separate subsequent sections of an annular space by an annular separating member It is needless to say that the separating member must be in sealing engagement with both the cylinder member and the container member in order to prevent undesirable leakage of fluid between susequent sections of the annular space. For facilitating the assembling of the device, it is recommended to locate the separating member into respective grooves of the outer cylindrical face of the cylinder member. The annular separating members can be made of longitudinal sealing strips which are inserted into the respective groove. The annular separating members obtained by circular shaping of such longitudinal strips are subjected to radial pressure during assembling by a radially inwardly directed projection to be shaped into the material of the container member, such as to radially compress the annular separating member. The ends of the strip enter into mutual sealing engagement such that a perfect sealing is obtained between subsequent sections of the annular space The material of the annular separating member should be weaker than the material of the cylinder member and preferably also weaker than the material of the container member. This combination of weaker and harder materials results in a perfect sealing action between the annular separating member and the cylinder member and the container member by plastic or elastic deformation of the separating member material The projections to be shaped into the material of the container member are preferably annular projections which are shaped along the circumference of the container member, such as to provide an annular projection on the inner circumferential face of the container member engaging the material of the annular separating member and a corresponding annular groove on the outer circumferential face of the container member. Due to the relative weakness of the material of the annular separating member as compared with the material of the cylinder member, deformation of the cylinder member is prevented such that the smooth movement of the piston member is guaranteed even in the axial areas of the cylinder member in which a separating member is provided.

The flow resistance of the flow passage systems may be selected by the radial bores having different flow cross-section areas.

At least one of the flow passage systems may have a plurality of axially spaced orifices allocated to one end portion of the respective movement range such that, in response to movement of the piston member along said end portion, the flow resistance of the respective flow passage system is varied by the number of orifices communicating with one of said working chambers being varied. A further possibility of controlling the flow resistance behaviour of a respective flow passage system exists in that the orifices of said plurality of orifices have a decreasing cross-sectional area along said end portion towards the respective end of the respective movement range. By the above-mentioned possibilities of controlling the flow resistance of the respective flow passage systems, it is possible to damp the movement of the piston rod member, when the piston member allocated to this piston rod member approaches the above-mentioned standstill range or approaches a terminal position within the cylinder member and more particularly the terminal position corresponding to the outermost position of the piston rod member with respect to the cylinder member.

When the piston member approaches the above-mentioned standstill range, and when as a result therefrom the movement of the piston rod member comes to a standstill, a further movement of the piston rod member may be obtained by exerting a manual force onto the piston rod member, such as to compress the fluid on one side of the piston member. For reducing the force necessary to move the piston member across the intermediate standstill range, it may be helpful that at least one valve unit is provided between said working chamber permitting fluid flow from one of said working chambers towards the other one of said working chambers in response to a predetermined pressure difference of a larger fluid pressure in said one working chamber and a smaller fluid pressure in the other working chamber. Such a valve unit may be provided within the piston member.

It is also possible that two one-way valve units may be provided between the working chambers for oppositely directed fluid flow between the working chambers.

Most preferably, the working chambers are filled with a pressurized gas. In such case, small volumes of liquid may be necessary for sealing and lubricating purposes.

In case of a construction and particularly a motor vehicle construction, one of the cylinder member and the piston rod member may be connected to a basic construction unit and the other one of said cylinder member and said piston rod member may be connected to a secondary construction member, such as a flap or a bonnet. The secondary construction member is movable with respect to the basic construction unit in opposite directions, namely a first direction against the action of gravity and a second direction under the action of gravity, said cylinder piston device supporting the movement of the secondary construction member in said first direction.

In such a case of utilization, the cylinder piston device may have—either alone or in combination with a further lifting device—a lifting force sufficient to overcome the action of gravity. In this case, the movement of the secondary construction member by the action of said lifting force is stopped in response to the piston member approaching the standstill range and may be continued under the action of an additional force acting against the action of gravity. So, a first open position of the flap or bonnet is obtained automatically by the lifting force when unlocking the locking mechanism of the bonnet or flap, and a second open position may be obtained by hand force acting onto the flap or bonnet in a direction against the action of gravity This hand force must be applied only as long as the piston rod member is within the standstill range. After the standstill range has been passed by the piston member, the further movement towards the second open position is again obtained automatically by the lifting force.

Alternatively, the cylinder piston device may also have either alone or in combination with a further lifting device—lifting force insufficient to overcome the action of gravity. In this alternative case, the secondary construction member may be moved by hand up to the fully open position. If the hand force is hereupon removed, the secondary construction member sinks down, until the uppermost standstill range becomes effective (fully open position). By additional hand force this uppermost standstill range may be overcome, and the secondary construction member sinks hereupon downwards, until an intermediate standstill range becomes effective (intermediate open position) and so on.

The various features of the invention are discussed especially in the accompanying claims which form a part of the disclosure. For the better understanding of the invention, its working advantages and specific effects, reference is now made to the accompanying drawings and the description, in which preferred forms of embodiment of the invention are discussed.

BRIEF DESCRIPTION OF THE DRAWINGS

The invention is represented in the accompanying drawings and will be described in greater detail below.

DETAILED DESCRIPTION OF PREFERRED EMBODIMENT

Figure 1:
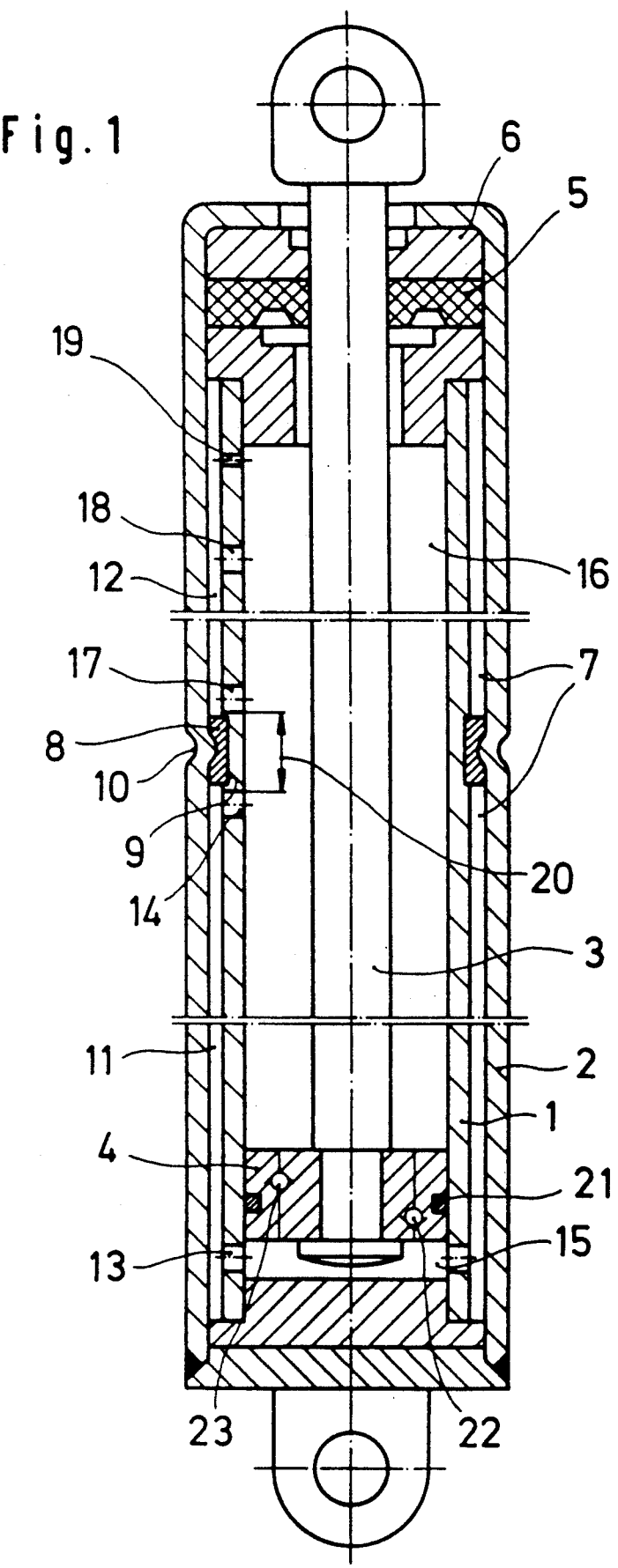
FIG. 1 shows a cylinder piston device constructed as pneumatic spring with an intermediate arresting region in a longitudinal section.

The cylinder piston devices shown in the drawings have a respective fixing eyelet at the lower end of the container and at the end of the piston rod projecting from the container. They are articulated by these fixing eyelets, e.g. between a rear flap and a vehicle body The cylinder piston device shown in FIG. 1 has a cylinder 1 which is clamped concentrically in a container 2. A piston rod 3 provided with a piston 4 is sealed from the exterior by the piston rod seal 5 and is guided in a piston rod guide 6. An annular space 7 is provided between the external wall of the cylinder 1 and the internal wall of the container 2. By means of a separating ring 8 arranged in a groove 9 in the cylinder 1 the annular space 7 is divided into a first axial section 11 and a second axial section 12. Lower radially extending orifices 13 and upper radially extending orifices 14 lead into the first axial section 11, the orifice 13 leading into the working chamber 15 and the orifice 14 into the working chamber 16. The separating ring 8 is radially prestressed by making a furrow 10 in the container 2 and forms a perfect seal between the axial sections 11 and 12. The flow passage system formed by the axial section 11 and the orifices 13 and 14 defines a first movement range of the piston 4 while a flow passage system for a second movement range is formed by the second axial section 12 and the radially extending orifices 17, 18 and 19 leading therein. A standstill range 20 which is defined by the distance between the orifices 14 and 17 leading into the separate axial sections 11 and 12 is provided between the two moving ranges A piston ring 21 is arranged in a piston groove for sealing the piston 4 on the internal cylindrical face of the cylinder 1. This piston 4 is also provided with spring-loaded one-way valves 22 and 23.

The pressure of the pressurized gas provided in the working chambers 15 and 16 can be selected such that the expulsion force of the piston rod 3 is somewhat greater than that corresponding to the weight of a flap so that, after the flap has been unlocked, it can be raised automatically by the cylinder piston device On the other hand, the pressure in the working chambers 15 and 16 may be such that the weight of the flap is not completely compensated and the cylinder piston device compensates only part of the weight of the flap, when the flap is opened by hand.

In the first design, the flap is raised by one or two cylinder piston devices which act upon it, the piston rod 3 travelling out and gas flowing from the working chamber 16 via the orifice 14, the axial section 11 and the orifice 13 into the lower working chamber 15 This expulsion movement of the piston rod 3 lasts until the piston 4 with the piston ring 21 formed, e.g., by an O-ring, travels over the upper orifice 14. The connection to the working chamber 15 is now interrupted as the arresting or standstill region 20 has been reached. The flap therefore remains in this first open position. If the flap is to be opened further, then an opening force has to be exerted on it by hand, so that the piston rod 3 is pulled out and the spring-loaded non-return valve 23 opens due to the pressure difference between the working chambers 16 and 15. If the radially extending orifice 17 is now passed over in the extraction direction of the piston rod 3, then a flow passage system formed by the second axial section 12 and the orifices 17, 18 and 19 leading therein exists between the working chamber 15 and the working chamber 16. The further opening movement of the flap is again automatic, the orifice 19 which is substantially smaller in cross-section being effective once the orifice 18 has been passed over. Substantially greater damping is achieved due to the small cross-section of the orifice 19 so that this damping acts as a type of buffer as the piston rod continues to travel out. The path in which the buffer is effective is determined by the distance between the radially extending orifice 18 and the orifice 19, the cross-section of the orifice 19 alone being decisive for the damping in this region of outward travel.

To close the rear flap, a closing force is exerted on it so that the piston rod 3 enters the container 2 against the expulsion force of the pressurized gas acting onto the piston rod 3. With a high speed of inward movement, the springloaded non-return valve 22 opens owing to the pressure difference developing between the working chamber 15 and the working chamber 16 If the piston rod 3 moves slowly inwards, the gas is exchanged via the flow passage system formed by the axial section 12 and the orifices 17, 18 and 19. After the orifice 17 has been travelled over, the valve 22 will open in any case, at least until the orifice 14 of the lower movement range is travelled over. The exchange of gas between the working chamber 16 and the working chamber 15 can now take place via the flow passage system allocated to the lower movement range, this flow passage system being formed by the axial section 11 and the orifices 13 and 14 leading therein.

Figure 2:
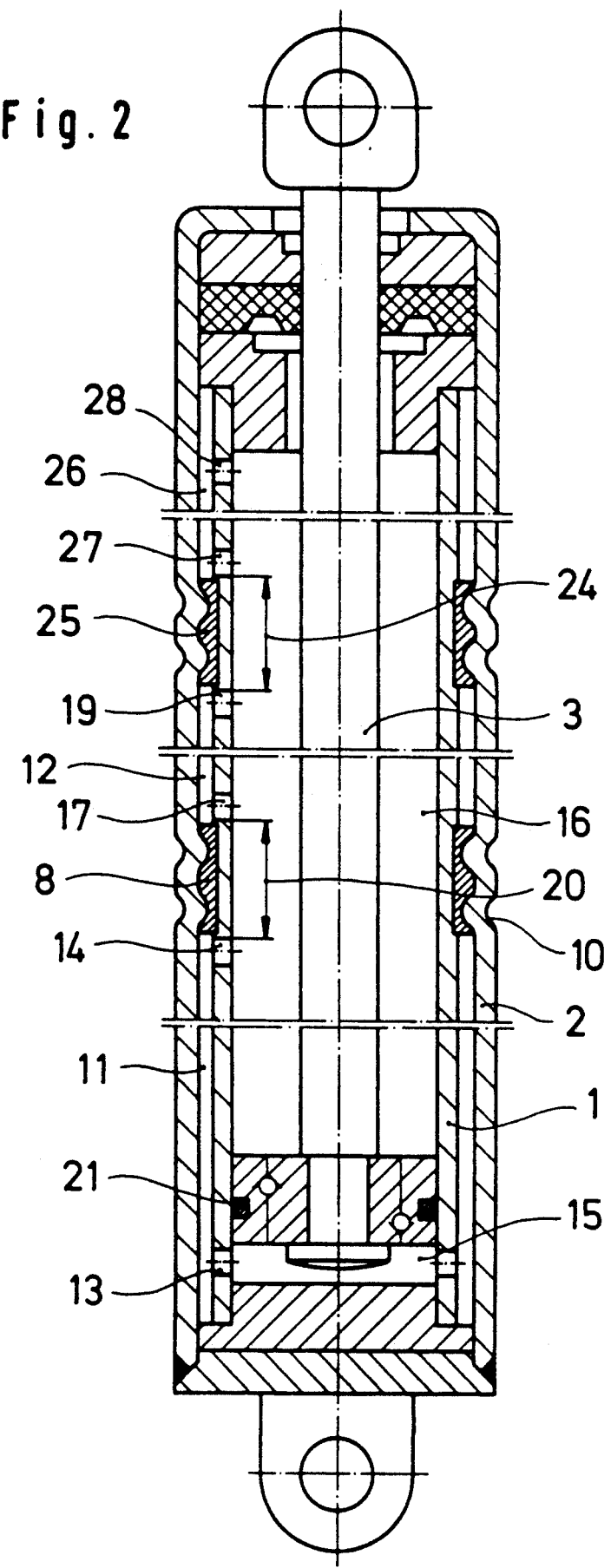
FIG. 2 shows a cylinder piston device with two intermediate arresting regions.

The embodiment according to FIG. 2 differs from the one according to FIG. 1 essentially in that three movement ranges are provided For this purpose, the annular space formed between the external cylindrical surface of the cylinder 1 and the internal cylindrical surface of the container 2 is divided by two separating rings 8 and 25 into three axial sections 11, 12 and 26. Three movement ranges are formed in this way, the axial section 11 with the orifices 13 and 14 being allocated as a flow passage system to the first movement range, as in FIG. 1, while the flow passage system consisting of axial section 12 and orifices 17 and 19 is allocated to a second movement range. The arresting or standstill range 20 is located between these two movement ranges. A second arresting or standstill range 24 which is defined by the axial distance between the orifices 19 and 27 is provided between the second and a third movement range. A flow passage system consisting of the third axial section 26 and the orifices 27 and 28 acts in this third movement range.

The operation of the cylinder piston device according to FIG. 2 corresponds substantially to that described with reference to FIG. 1. The only difference is that two intermediate arresting or standstill ranges are provided at 20 and 24. Therefore, two intermediate positions of the flap can be set besides a fully opened position.

Figure 4:
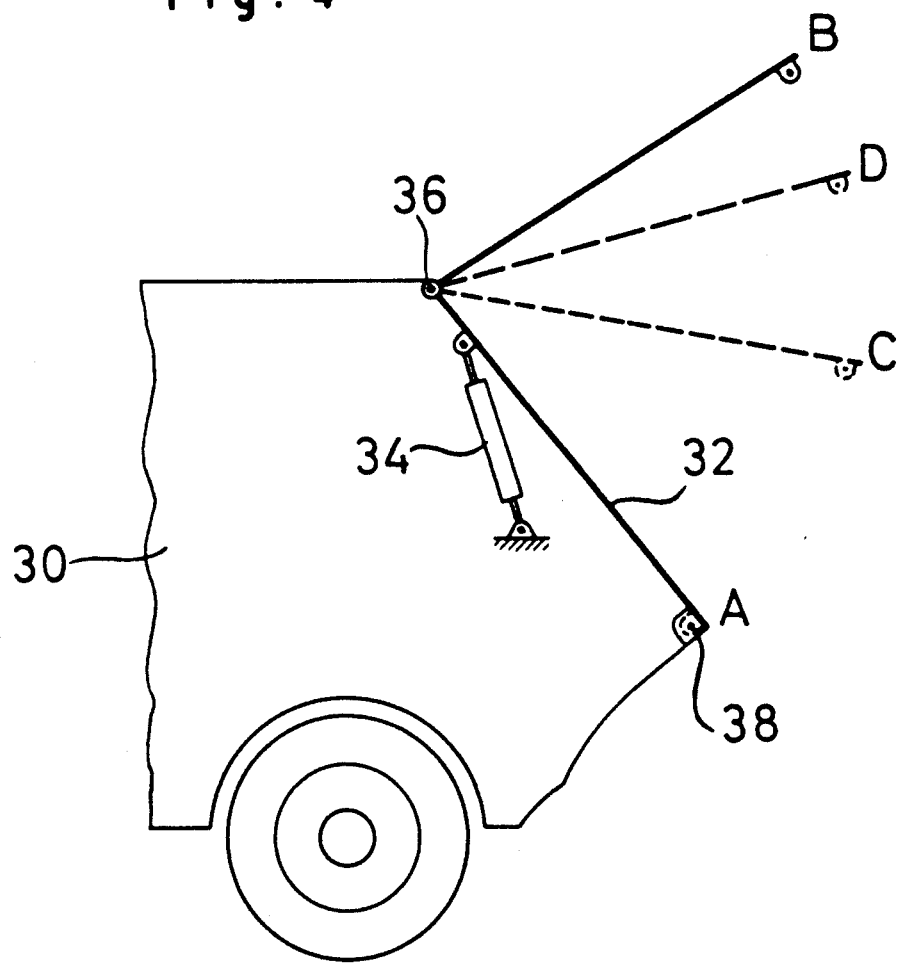
FIG. 4 shows a cylinder piston device of this invention as a part of a motor vehicle.

In FIG. 4 there is shown a motor vehicle 30 comprising a rear flap 32 and a gas spring 34 as shown in FIG. 2. The flap 32 is articulated about a horizontal axis 36 and can be locked by lock means 38 in the closed position The expulsion force of the gas spring 34 is selected such that it overcomes along the total range of movement the gravity acting onto the flap 32. The closed position of the flap 32 is designated by A, the fully opened position is designated by B. The intermediate positions which are obtained by a gas spring as shown in FIG. 2, are designated by C and D.

Figure 3:
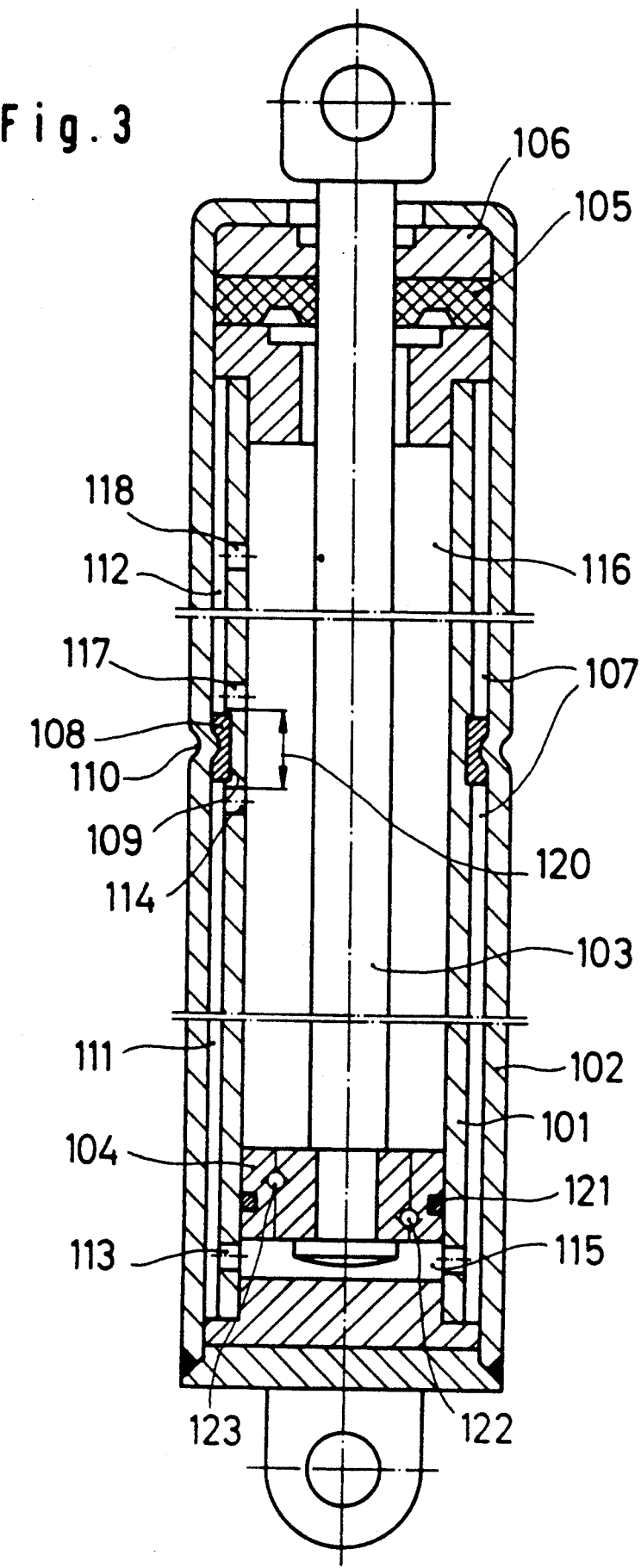
FIG. 3 shows a cylinder piston device with a terminal arresting region and an intermediate arresting region.

In FIG. 3 a further embodiment is shown which is very similar to the embodiment of FIG. 1. Analogous parts are designated by the same reference numbers as in FIG. 1 increased by 100, The only difference is that the orifice 19 of FIG. 3 has been eliminated.

The embodiment of FIG. 3 is again adapted for use in a construction as shown in FIG. 4. It is assumed now that the expulsion force exerted onto the piston rod 103 by the pressurized gas is not sufficient to overcome the action of gravity onto the flap. After the locking means 38 of FIG. 4 has been unlocked, the flap 32 remains in the closed position A. By exerting a lifting force by hand onto the flap, the flap can be lifted easily, because the expulsion force supports the lifting movement. When the piston ring 121 travels through the standstill range 120, an increased lifting force must be exerted so that the non-return valve 123 is opened After the standstill range 120 has been passed by the piston ring 121, the further movement of the flap into the fully opened position B can be effected again with a reduced lifting force exerted by hand. After the uppermost orifice 118 has been overtravelled by the piston ring 121, the working chamber 116 and 115 are separated from each other, the further upward movement is possible by increased hand force, such as to open the non-return valve 123. If the piston rod 103 finally arrives at its uppermost position, i.e., when the piston 104 abuts against the upper end of the working chamber 116, the lifting force exerted by hand may be removed. The piston rod 103 moves downward for a short distance, such as to increase the pressure within the working chamber 115 The piston ring 121 remains, however, above the orifice 118 So, the flap remains in a fully opened position corresponding to the position B in FIG. 4. For closing the flap 32 again, it is necessary to exert a downwards directed force by hand onto the flap 32 so that the non-return valve 122 opens, and the piston ring 121 travels across the orifice 118. Hereupon the flap sinks downwards automatically, gas exchange occurring between the working chambers 115 and 116 through the flow passage system 112, 118 and 117. After the piston ring 121 has passed the orifice 117 and has entered within the standstill range 120, the flap comes to a standstill again, because none of the flow passage systems 112, 118, 117 and 111, 114, 113 connects the two working chambers 116, 115. So, an intermediate stable opening position of the flap exists. For completely closing the flap, it is again necessary to exert a downwards directed force by hand onto the flap 32 such that the non-return valve 122 is opened, and the piston ring 121 is moved below the location of the orifice 114. Now the flow passage system 114, 111, 113 connects the two working chambers 116 and 115 again such that the flap can sink automatically down to the closed position A without a lowering force being exerted by hand. It is to be noted that also in this embodiment two intermediate standstill ranges can be provided It is further to be noted that in this embodiment a damping action may be provided adjacent the lower end position of the piston rod 103 by providing a series of axially spaced bores instead of one bore 113 as shown in FIG. 3. It is further to be noted that the speed of the downward sinking piston rod 103 may also be reduced when approaching the standstill range 120 by providing a series of spaced orifices instead of one orifice 117 as shown in FIG. 3.

Specific forms of embodiment of the invention have been represented and described in order to illustrate the use of the principles of the invention. Of course, the invention can also be realized in other ways without departing from these principles.

The reference numbers in the claims serve only for facilitation of understanding and are not to be understood as a limitation.

We claim:

1. A cylinder piston device comprising:
    a cylinder member (1) defining a cavity therein, said cavity having an axis and two ends;
    a piston rod member (3) sealingly guided through at least one of said two ends;
    a piston member (4) sealingly engageable with an internal cylindrical face of said cylinder member (1) and connected with said piston rod member (3) within said cavity so as to divide said cavity into two working chambers (15, 16);
    said working chambers (15, 16) containing a fluid;
    means defining at least two different flow passage systems (11, 13, 14; 12, 17, 18) for interconnecting said working chambers (15, 16) across said piston member (4) in response to the axial position of said piston member (4), so that, in respective movement ranges of said piston member (4), said working chambers (15, 16) are interconnected with each other by a respective one of said flow passage systems (11, 13, 14; 12, 17, 18) and, in an intermediate standstill range (20) of said piston member (4) axially between said movement ranges, none of said flow passage systems (11, 13, 14; 12, 17, 18) interconnects said working chambers (15, 16);

said flow passage system defining means comprising at least two axially spaced orifices (13, 14; 17, 18) in each of said flow passage systems (11, 13, 14; 12, 17, 18) extending substantially radially across said cylinder member (1);

said flow passage system defining means further comprising respective substantially axially extending flowpaths (11, 12) radially outside said internal cylindrical face of said cylinder member (1) for interconnecting said at least two orifices (13, 14; 17, 18) of each said flow passage system (11, 13, 14; 12, 17, 18);

the axial distances between said at least two orifices (13, 14; 17, 18) of the respective flow passage systems (11, 13, 14; 12, 17, 18) defining said respective movement ranges, and the axial distance between the most closely located orifices (14, 17) of said respective different flow passage system (11, 13, 14; 12, 17, 18) defining said standstill range (20); and said flow passage system defining means further comprising means for structurally separating said radially outside flow paths (11; 12) of said respective different flow passage systems (11, 13, 14; 12, 17, 18) from each other.

2. A cylinder piston device as set forth in claim 1, at least part of said orifices (13, 14; 17, 18) being radial bores through said cylinder member (1).

3. A cylinder piston device as set forth in claim 2, at least part of said radial bores being rounded or chamfered at the entrance into said internal cylindrical face of said cylinder member (1).

4. A cylinder piston device as set forth in claim 1, said piston member (4) being provided with a sealing piston ring (21) engageable with said internal cylindrical face of said cylinder member (1).

5. A cylinder piston device as set forth in claim 1, said flow paths (11;12) being provided within an annular space (7) radially between said cylinder member (1) and a container member (2) surrounding said cylinder member (1).

6. A cylinder piston device as set forth in claim 1, one or more of said offices (13, 14, 17, 18, 19) having different flow cross-section areas.

7. A cylinder piston device as set forth in claim 1, at least one of said flow passage systems (12,17,18,19) having a plurality of axially spaced orifices (18,19) allocated to an end portion of the respective movement range such that, in response to movement of said piston member (4) along said end portion, the flow resistance of the flow passage system (12,17,18,19) is varied by the number of orifices (18,19) communicating with one of said working chambers (15,16) being varied.

8. A cylinder piston device as set forth in claim 7, the orifices (18,19) of said plurality of orifices (18,19) having a decreasing cross-sectional area along said end portion towards the respective end of the respective movement range.

9. A cylinder piston device as set forth in claim 1, at least one valve means (22,23) being provided between said working chambers (15,16) for permitting fluid flow from one (15) of said working chambers (15,16) towards the other one (16) of said working chambers (15,16) in response to a predetermined pressure difference of a larger fluid pressure in said one working chamber (15) and a smaller fluid pressure in said other working chamber (16).

10. A cylinder piston device as set forth in claim 9, two one-way valve means (22,23) being provided between said working chambers (15,16) for oppositely directed fluid flow.

11. A cylinder piston device as set forth in claim 1, said fluid in said working chambers (15,16) being under superatmospheric pressure.

12. A cylinder piston device as set forth in claim 11, said working chambers (15,16) containing a pressurized gas.

13. A cylinder piston device as set forth in claim 1, one of said cylinder member (1) and said piston rod member (3) being connected to a basic construction unit (30) and the other one of said cylinder member (1) and said piston rod member (3) being connected to a secondary construction member (32), said secondary construction member (32) being movable with respect to said basic construction unit (30) in opposite directions, namely a first direction against the action of gravity on said secondary construction member (32) and a second direction under the action of gravity on said secondary construction member (32), said cylinder piston device (34) supporting the movement of said secondary construction member (32) in said first direction.

14. A cylinder piston device as set forth in claim 13, said cylinder piston device (34) exerting—either alone or in combination with a further lifting device—a lifting force sufficient to overcome the action of gravity on said secondary construction member (32), movement of said secondary construction member (32) by said lifting force being braked in response to said piston member (4) approaching said standstill range (20).

15. A cylinder piston device as set forth in claim 13, said cylinder piston device (34) having—either alone or in combination with a further lifting device—a lifting force insufficient to overcome the action of gravity on said secondary construction member (32), movement of said secondary construction member (32) against said lifting force being braked by said piston member (4) approaching said standstill range (20).

16. A cylinder piston device comprising:
a cylinder member (1) defining a cavity therein, said cavity having an axis and two ends;
a container member (2) surrounding said cylinder member (1) and defining therewith an annular space (7);
a piston rod member (3) sealingly guided through at least one of said two ends;
a piston member (4) sealingly engageable with an internal cylindrical face of said cylinder member (1) and connected with said piston rod member (3) within said cavity so as to divide said cavity into two working chambers (15, 16);
said working chambers (15, 16) containing a fluid;
means defining at least two different flow passage systems (11, 13, 14; 12, 17, 18) for interconnecting said working chambers (15, 16) across said piston member (4), in response to the axial position of said piston member (4), so that, in respective movement ranges of said piston member (4), said working chambers (15, 16) are interconnected with each other by a respective one of said flow passage systems (11, 13, 14; 12, 17, 18) and, in an intermediate standstill range (20) of said piston member (4) axially between said movement ranges, none of said flow passage system (11, 13, 14; 12, 17, 18) interconnects said working chambers (15, 16);

said flow passage system defining means comprising at least two axially spaced orifices (13, 14; 17, 18) in each of said flow passage systems (11, 13, 14; 12, 17, 18) extending substantially radially across said cylinder member (1);

said flow passage system defining means further comprising means for defining respective substantially axially extending flow paths (11, 12) radially outside said internal cylindrical face of said cylinder member (1) for interconnecting said at least two orifices (13, 14; 17, 18) of each said flow passage system (11, 13, 14; 12, 17, 18);

said flow path defining means comprising respective axial sections (11; 12) of said annular space and an annular member (8) extending radially between said cylinder member (1) and said container member (2) for axially separating said axially adjacent sections (11; 12);

the axial distances between said at least two orifices (13, 14; 17, 18) of the respective flow passage systems (11, 13, 14; 12, 17, 18) defining said respective movement ranges, and the axial distance between the most closely located orifices (14, 17) of said respective different flow passage systems (11, 13, 14; 12, 17, 18) defining said standstill range (20); and said flow passage defining means further comprising means for structurally separating said radially outside flow paths (11; 12) of said respective different flow passage systems (11, 13, 14; 12, 17, 18) from each other.

17. A cylinder piston device as set forth in claim 16, said annular separating, member (8) being located within an annular recess of said cylinder member (1).

18. A cylinder piston device as set forth in claim 16, said annular separating member (8) being made of a material weaker than the material of said cylinder member (1).

19. A cylinder piston device as set forth in claim 16, said annular separating member (8) being engaged by a radially inwards directed projection (10) of said container member (2).

20. A cylinder piston device as set forth in claim 19, said radially inwards directed projection (10) of said container member (2) being an annular projection.

21. A cylinder piston device as set forth in claim 19, said annular separating member (8) being submitted to radial and circumferential compression by said radially inwards directed projection (10).

22. A cylinder piston device comprising:
a cylinder member (101) defining a cavity therein, said cavity having an axis and two ends;
a piston rod member (103) sealingly guided through one of said two ends;
a piston member (104) sealingly engageable with an internal cylindrical face of said cylinder member (101) and being connected with said piston rod member (103) within said cavity, so as to divide said cavity into two working chambers (115, 116);

said working chambers (115, 116) containing a gas under superatmospheric pressure;

means defining at least one flow passage system (112, 117, 118) for interconnecting said working chambers (115, 116) across said piston member (104) in response to the axial position of said piston member (104), so that, in a movement range of said piston member (104), said working chambers (115, 116) are interconnected with each other by said flow passage system (112, 117, 118) and, in a standstill range of said piston member (104) axially adjacent said movement range, said working chambers (115, 116) are not interconnected by said flow passage system (112, 117, 118);

said flow passage system defining means comprising at least two axially spaced orifices (117, 118) extending substantially radially across said cylinder member (101) and a substantially axially extending flow path (112) radially outside said cavity interconnecting said orifices (117, 118);

the axial distance between said at least two orifices (117, 118) defining said axial movement range of said piston member (104);

at least one one-way valve means (123) being provided between said working chambers (115, 116) for opening to permit fluid flow therethrough from one (116) of said working chambers (115, 116) to the other one (115) of said working chambers (115, 116), in response to a predetermined pressure difference of a larger fluid pressure in said one working chamber (116) and a smaller fluid pressure in said other working chamber (115), when said piston member (104) is brought from said movement range into said standstill range by a first predetermined axial force acting onto said piston rod member (103) in a first axial direction, and for closing to prevent said fluid therethrough when, by a second predetermined axial force acting on said piston rod member (103) in an opposite axial direction, said piston member is moved while still remaining within the standstill range towards the movement range such as to reverse the direction of the pressure difference between said working chambers (115, 116) until the value of the reversed pressure difference balances said second predetermined axial force;

said two working chambers (115, 116) being hermetically sealed form each other when said piston member is within said standstill range and said at least one one-way valve means (123) is closed.

23. A cylinder piston device as claimed in claim 22, further comprising a second one-way valve means (122) of opposite flow direction being provided between said working chambers (115, 116), said second one-way valve means (122) being opened in response to an increased value of reversed pressure differences resulting from a third predetermined axial force acting on said piston rod member in said opposite axial direction.

* * * * *

UNITED STATES PATENT AND TRADEMARK OFFICE
CERTIFICATE OF CORRECTION

PATENT NO. : 5,040,645
DATED : August 20, 1991
INVENTOR(S) : Stefan Volpel, Wolfgang Zankl It is certified that error appears in the above-identified patent and that said Letters Patent is hereby corrected as shown below:

Col. 5, line 13, "have either" should read --have - either--;
Col. 5, line 14, "lifting" should read --a lifting--;
Col. 9, line 47, "offices" should read --orifices--;
Col. 11, line 36, "separating, member" should read --separating member--;
Col. 12, line 50, "form" should read --from--; and
Col. 12, line 58, "differences" should read --difference--.

Signed and Sealed this

Twenty-third Day of March, 1993

Attest:

STEPHEN G. KUNIN

*Attesting Officer*  *Acting Commissioner of Patents and Trademarks*